US006559241B2

(12) United States Patent
Iwasaki et al.

(10) Patent No.: US 6,559,241 B2
(45) Date of Patent: May 6, 2003

(54) PROCESS FOR PRODUCING A HYDROGENATED POLYMER

(75) Inventors: Hideharu Iwasaki, Kurashiki (JP); Hiroyuki Ohgi, Kurashiki (JP); Kikuo Arimoto, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/096,821

(22) Filed: Mar. 14, 2002

(65) Prior Publication Data

US 2002/0137854 A1 Sep. 26, 2002

(30) Foreign Application Priority Data

Mar. 14, 2001 (JP) ........................................ 2001-071530

(51) Int. Cl.⁷ .................................................. C08F 8/04
(52) U.S. Cl. ................ 525/338; 525/327.9; 525/328.8; 525/328.9; 525/326.6; 525/339
(58) Field of Search ................................. 525/338, 339

(56) References Cited

U.S. PATENT DOCUMENTS

| 2,915,511 A | | 12/1959 | Blanchette |
| 3,459,814 A | * | 8/1969 | Kovach et al. ............. 568/852 |
| 3,974,227 A | | 8/1976 | Berthoux et al. |
| 3,994,868 A | | 11/1976 | Inomata et al. |
| 4,101,599 A | | 7/1978 | Debande et al. |
| 4,107,225 A | | 8/1978 | Debande et al. |
| 4,501,685 A | | 2/1985 | Thomson et al. |
| 4,560,817 A | | 12/1985 | Bobsein et al. |
| 5,043,498 A | | 8/1991 | Ishii et al. |
| 5,378,767 A | | 1/1995 | Massie |
| 5,391,637 A | | 2/1995 | Willis et al. |
| 5,969,195 A | | 10/1999 | Stabel et al. |

FOREIGN PATENT DOCUMENTS

| DE | 28 45 615 | 4/1979 |
| DE | 30 46 251 | 9/1981 |
| DE | 34 10 069 | 10/1985 |
| EP | 0 319 967 | 6/1989 |
| EP | 0 378 104 | 7/1990 |
| EP | 0 814 098 | 12/1997 |
| GB | 814003 | 5/1959 |
| JP | 61-36002 | 8/1986 |

\* cited by examiner

*Primary Examiner*—Bernard Lipman
(74) *Attorney, Agent, or Firm*—Oblon, Spivak, McClelland, Maier & Neustadt, P.C.

(57) ABSTRACT

A hydrogenated polymer is prepared by a method comprising:

hydrogenating a polymer having carbon—carbon double bonds and a hydroxy group and/or a functional group which is convertible into a hydroxy group or into a hydroxymethyl group in the presence of a catalyst of palladium on a base activated carbon and/or platinum on a base activated carbon.

20 Claims, No Drawings

PROCESS FOR PRODUCING A HYDROGENATED POLYMER

BACKGROUND OF THE INVENTION

1. Field Of The Invention

The present invention relates to a process for producing a hydrogenated polymer having a hydroxy group and/or a functional group which is convertible into a hydroxy group or into a hydroxymethyl group.

2. Description Of The Background

An olefinic polymer having at least one functional group and olefinic carbon—carbon double bonds, an example of which is polybutadienediol, has property insufficiencies such as low heat resistance and unacceptable weatherability. However, hydrogenation of such an olefinic polymer removes the sites of unsaturation in the polymer thereby improving these properties of the polymer.

The hydrogenation of a polymer can be accomplished using various metal catalysts, such as nickel catalysts, palladium catalysts, platinum catalysts, titanium catalysts and rhodium catalysts. Among the processes for the hydrogenation of a polymer, the technique of using a supported catalyst in which the active metal is supported on a carrier is useful because the catalyst can be easily removed from the reaction mixture after hydrogenation. Useful techniques of hydrogenating such polymers containing carbon—carbon double bonds and a hydroxy group in the presence of a supported catalyst include the following:

[1] U.S. Pat. No. 3,994,868 (hereinafter abbreviated as "document 1") discloses a process in which a hydroxylated polybutadiene is hydrogenated with ruthenium on carbon or ruthenium on alumina.

[2] Japanese Patent Publication No. Sho 61-36002 (JP-B 86-36002) [hereinafter abbreviated as "document 2"] discloses a process in which a hydroxylated polybutadiene is hydrogenated with a metal catalyst such as ruthenium or palladium on a porous carbon support.

[3] U.S. Pat. No. 5,378,767 (hereinafter abbreviated as "document 3") discloses a process in which a polybutadienediol having a molecular weight of 2,000 is hydrogenated with a catalyst of palladium on α-alumina.

Document 1 discloses that a ruthenium catalyst can produce a hydrogenated polymer at high hydrogenation ratio without the elimination of the terminal hydroxy group. However, it has now been found that a hydrogenation process using ruthenium on a carrier detrimentally involves elution of ruthenium from the catalyst which reduces the stability of the hydrogenated polymer. The patent also discloses, as "Comparative Examples", a process in which a hydroxylated polybutadiene is hydrogenated with other metal catalysts such as palladium on carbon, rhodium on carbon, osmium on carbon, platinum on carbon and nickel-kieselguhr. The patent shows that palladium on carbon and rhodium on carbon may cause the elimination of the hydroxy group and that osmium on carbon, platinum on carbon and nickel-kieselguhr cannot achieve sufficient hydrogenation ratios.

Document 2 also discloses that the ruthenium catalyst can produce a hydrogenated polymer having a high hydrogenation ratio without the elimination of the terminal hydroxy group [see Examples 1 and 2]. However, the elution of ruthenium may be involved which reduces the stability of the hydrogenated polymer. On the other hand, the palladium catalyst can achieve a high hydrogenation ratio of 93%, but it results in the elimination of the hydroxy group [see Example 3].

Document 3 stresses that the hydrogenation process disclosed can avoid the difficulties involved with the removal of metal catalyst residues from the hydrogenated polymer. The patent also discloses that the specific catalyst is selective towards the hydrogenation of hydroxylated polydienes such that very little of the hydroxy group content is lost during the hydrogenation process. However, the present inventors have found that the elimination of the hydroxy group is inevitably involved when the method described in the patent is employed for the hydrogenation of polybutadienes having high molecular weights of 10,000 or more.

A functional group such as hydroxy group can impart to a polymer various good properties such as hydrophilicity, print or paint adhesion properties, heat adhesion properties to other polymers and so on. Therefore a polymer having a functional group is useful, depending on the strength of its properties, for a packaging material, a molding material or other kinds of sheets, films, fibers or coatings, or as a component of a polymer alloy or as a polymer blend.

In case of a hydrogenation of a polymer having a functional group, the functional group is preferably retained through the hydrogenation process.

On the other hand, a high hydrogenation ratio is recommended for the hydrogenation of an olefinic polymer having a carbon—carbon double bond in order to substantially improve the heat resistance and weatherability of the olefinic polymer.

In the case of the hydrogenation of an olefinic polymer having a functional group such as hydroxy group, the elution of a metal component of the catalyst during the hydrogenation process tends to reduce the stability of the hydrogenated polymer. This tendency becomes remarkable, if the olefinic polymer has hydroxy group or an analogous group such as an epoxy group or derivatives of a hydroxy group. In addition, this tendency becomes more remarkable, when the content of hydroxy group or analogous groups in the olefinic polymer grow in number. Therefore, it is safe to avoid use of a ruthenium catalyst, which inevitably involves the elution of ruthenium, for the hydrogenation of an olefinic polymer having a hydroxy group or an analogous group and containing carbon—carbon double bonds.

However, no process has been found for the hydrogenation of an olefinic polymer having a hydroxy group or analogous group and carbon—carbon double bonds using a catalyst other than a ruthenium catalyst at high hydrogenation ratios and without the elimination of the hydroxy group or its analog.

Moreover, in view of industrial requirements, hydrogenation should be able to be performed efficiently. It is necessary to achieve not only a high hydrogenation ratio but also a sufficient hydrogenation rate.

SUMMARY OF THE INVENTION

Accordingly, one object of the present invention is to provide an industrially advantageous process for producing a hydrogenated polymer by the hydrogenation of an olefinic polymer having carbon—carbon double bonds and a hydroxy group and/or a group which is analogous to the hydroxy group with high retention of the functional group, high hydrogenation ratios and good hydrogenation rates.

Briefly, this object and other objects of the present invention as hereinafter will become more readily apparent can be attained by a method of producing a hydrogenated polymer, comprising:

hydrogenating a polymer having carbon—carbon double bonds and a hydroxy group and/or a functional group which is convertible into a hydroxy group or into a hydroxymethyl group in the presence of palladium on a base activated carbon and/or platinum on a base activated carbon.

DETAILED DESCRIPTION OF THE PREFERRED EMBODIMENTS

It has now been discovered that the hydrogenation of an olefinic polymer having carbon—carbon double bonds and a hydroxy group in the presence of a supported palladium catalyst or a supported platinum catalyst, can avoid the problem of the elution of the metal component of the catalyst during hydrogenation. Thus, it has been found that, when palladium on a base activated carbon is used as the catalyst, the hydrogenation of an olefinic polymer having carbon—carbon double bonds and a hydroxy group proceeds with much less elimination of the hydroxy group and does not adversely affect the rate of hydrogenation of the polymer compared to the case in which a conventional palladium catalyst is used as a catalyst. Moreover, it has been found that platinum on a base activated carbon can achieve a similar result. The present invention has been made on these findings and additional studies.

The present invention provides a process for producing a hydrogenated polymer from a polymer having carbon—carbon double bonds and a hydroxy group and/or a functional group which is convertible into hydroxy group or into a hydroxymethyl group in which hydrogenation is conducted in the presence of palladium on a base activated carbon and/or platinum on a base activated carbon. Hereinafter, a "polymer having carbon—carbon double bonds and a hydroxy group and/or a functional group which is convertible into hydroxy group or into hydroxymethyl group" is referred to as an "unsaturated polymer".

The unsaturated polymer may contain a hydroxy group and/or a functional group convertible into hydroxy group or into a hydroxymethyl group in an amount of preferably 1 to 500 mole %, more preferably 1 to 300 mole %, based on all the monomer units in the polymer.

Suitable functional groups convertible into hydroxy groups include, for example, epoxy groups and protected hydroxy groups. Suitable functional groups convertible into hydroxymethyl groups include, for example, protected carboxyl groups and protected aldehyde groups. Among them, the epoxy group, a protected hydroxy group and a protected carboxyl group are preferred.

The protective groups for the hydroxy group include, for example, alkyl groups such as methyl, ethyl and tert-butyl; aralkyl groups such as benzyl; aryl groups such as phenyl; alkoxyalkyl groups such as methoxymethyl and ethoxyethyl; acyl groups such as acetyl, propionyl and benzoyl; alkoxycarbonyl groups such as methoxycarbonyl, ethoxycarbonyl, tert-butoxycarbonyl and benzyloxycarbonyl; silyl groups such as trimethylsilyl and tert-butyldimethylsilyl. Suitable protective groups for the carboxyl group include, for example, alkyl groups such as methyl and ethyl. Suitable protected aldehyde groups include cyclic acetals having a dioxyalkylene moiety such as methylenedioxy and ethylenedioxy.

The unsaturated polymer can contain a lactone moiety, which is derived from a carboxyl group and a hydroxy group, and a cyclic hemiacetal moiety, which is derived from an aldehyde group and a hydroxy group. The protected hydroxy groups include groups such as the lactone moiety and the cyclic hemiacetal moiety.

Suitable examples of a functional group convertible into a hydroxy group include the epoxy group; acyloxy groups such as acetyloxy and benzoyloxy; alkoxy groups such as methoxy, ethoxy, propoxy, tert-butoxy, allyloxy and benzyloxy; alkoxycarbonyloxy groups or aryloxycarbonyloxy groups such as methoxycarbonyloxy, ethoxycarbonyloxy, tert-butoxycarbonyloxy, phenyloxycarbonyloxy and benzyloxycarbonyloxy; alkoxyalkyleneoxy groups such as methoxymethyleneoxy, methoxyethyleneoxy and ethoxyethyleneoxy; siloxy groups such as trimethylsiloxy and tert-butyldimethylsiloxy. Suitable examples of a functional group convertible into hydroxymethyl group include ester groups such as carboxymethyl, carboxyethyl and carboxybutyl.

There is no particular restriction on the distribution of the hydroxy groups and/or the functional groups convertible into hydroxy groups or convertible into hydroxymethyl groups in the unsaturated polymer. The type of distribution can be regular, block-like, random or tapered-like. The distribution may be of the mixed type of two or more of the above groups.

When the unsaturated polymer has a side chain, the hydroxy groups and/or the functional groups convertible into hydroxy groups or into hydroxymethyl groups may be located on the main chain of the polymer, the side chain of the polymer or both of them. In addition, the hydroxy groups and/or the functional groups convertible into hydroxy group or into the hydroxymethyl group may be located at one end or both ends of the main chain of the unsaturated polymer.

The carbon—carbon double bond content of the unsaturated polymer preferably ranges from 1 to 500 mole %, more preferably from 1 to 300 mole %, based on all the monomer units in the polymer. Each individual carbon—carbon double bond may be either of the cis or trans form. There is no particular restriction on the distribution of the carbon—carbon double bonds in the unsaturated polymer. The distribution may be regular, block-like, random or tapered-like. The distribution may be a combination of two or more of the above types of distribution.

When the unsaturated polymer has a side chain, the carbon—carbon double bonds may be located at the main chain of the polymer, the side chain of the polymer or both of them. In addition, the carbon—carbon double bond may be located at an end of the polymer.

The number average molecular weight of the unsaturated polymer can range preferably from 1,000 to 1,000,000.

The unsaturated polymer may be one produced by any known method of polymerization such as by radical polymerization, by ionic polymerization, by coordination polymerization and by metathesis polymerization.

A polymer prepared from a conjugated diene or a copolymer of a conjugated diene and another type of monomer are preferred as the unsaturated polymer. A conjugated diene having a hydroxy group and/or a functional group convertible into a hydroxy group or into a hydroxymethyl group (i) and/or another type of monomer, which is copolymerizable with a conjugated diene, having a hydroxy group and/or a functional group convertible into a hydroxy group or into a hydroxymethyl group (ii) may be used for all or a part of the raw materials of the unsaturated polymer.

One or more than two types of monomers may be used as the conjugated diene, and one or more than two types of monomers can be used as the monomer which is copolymerizable with a conjugated diene.

Suitable examples of the conjugated dienes include linear conjugated dienes, which may have a substituent, such as 1,3-butadinene, isoprene, 1,3-pentadiene, 1,3-hexadiene and chloroprene; cyclic conjugated dienes such as cyclopentadiene, 1,3-cyclohexadiene, 1,3-cycloheptadiene and 1,3-cyclooctadiene. The conjugated dienes also include conjugated dienes having a hydroxy group and/or a functional group convertible into a hydroxy group or into a hydroxymethyl group such as 1-acetyloxy-1,3-butadiene, 1-tert-butoxy-1,3-butadiene, 1-methoxycarbonyloxy-1,3-butadiene, 1-trimethylsiloxy-1,3-butadiene, 2-acetyloxy-1,3-butadiene, 2-tert-butoxy-1,3-butadiene, 2-methoxycarbonyloxy-1,3-butadiene, 2-trimethylsiloxy-1,3-butadiene, 1-acetyloxy-2-methyl-1,3-butadiene, 1-tert-butoxy-2-methyl-1,3-butadiene, 1-methoxycarbonyloxy-2-methyl-1,3-butadiene, 1-trimethylsiloxy-2-methyl-1,3-butadiene, 1-acetyloxy-3-methyl-1,3-butadiene, 1-tert-butoxy-3-methyl-1,3-butadiene, 1-methoxycarbonyloxy-3-methyl-1,3-butadiene, 1-trimethylsiloxy-3-methyl-1,3-butadiene, 2-acetyloxy-3-methyl-1,3-butadiene, 2-tert-butoxy-3-methyl-1,3-butadiene, 1-methoxycarbonyloxy-3-methyl-1,3-butadiene and 2-trimethylsiloxy-3-methyl-1,3-butadiene.

Suitable examples of other types of monomers, which are copolymerizable with a conjugated diene, include styrene, styrene derivatives, which may have a substituent, such as α-methylstyrene, ethylstyrene, chlorostyrene and bromostyrene; α-olefins such as ethylene, propylene, 1-butene, 2-butene, isobutene, 1-pentene, 2-pentene and 1-hexene; cycloolefins such as cyclohexene, cycloheptene and cyclooctene. Other types of monomers also include monomers having a hydroxy group and/or a functional group convertible into a hydroxy group or into a hydroxymethyl group such as acrylic acid or its esters; e.g. methyl acrylate, ethyl acrylate, propyl acrylate, butyl acrylate or glycidyl acrylate. Monomers also include methacrylic acid and its esters; e.g. methyl methacrylate, ethyl methacrylate, propyl methacrylate, butyl methacrylate and glycidyl methacrylate. Monomers also include acrylamide or its derivatives; methacrylamide or its derivatives; vinyl esters of vinyl acetate or vinyl propionate; vinyl ethers such as methy vinyl ether, ethyl vinyl ether, propyl vinyl ether, butyl vinyl ether, tert-butyl vinyl ether and trimethylsilyl vinyl ether; acrylonitrile; methacrylonitrile; acrolein; methacrolein; substituted styrenes such as hydroxystyrene, acetoxystyrene, t-butoxystyrene or trimethylsiloxystyrene; substituted α-olefins of 3-butene-1-ol, 1,2-diacetoxy-3-butene or 1,2-di (methoxycarbonyloxy)-3-butene; substituted cycloolefins of 4-cyclooctene-1-ol, 1-acetoxy-4-cyclooctene, 3-cyclooctene-1-ol, 1-acetoxy-3-cyclooctene, 5-cyclooctene-1,2-diol, 1,2-diacetoxy-5-cyclooctene, 1,2-di (methoxycarbonyloxy)-5-cyclooctene, 4-cyclooctene-1,2-diol, 1,2-diacetoxy-4-cyclooctene and 1,2-di (methoxycarbonyloxy)-4-cyclooctene.

The unsaturated polymer may also be prepared by the polymerization of a conjugated diene or a copolymerization of a conjugated diene and another type of monomer using a chemical reagent having a hydroxy group and/or a functional group convertible into a hydroxy group or into a hydroxymethyl group as a polymerization initiator and/or a polymerization terminator. In such a case, the hydroxy group and/or a functional group convertible into a hydroxy group or into a hydroxymethyl group is located at one end or both ends of the unsaturated polymer.

More specifically, the unsaturated polymer having a hydroxy group and/or a functional group convertible into a hydroxy group or into a hydroxymethyl group at one end or both ends of the polymer can be obtained by radical polymerization using hydrogen peroxide as a polymerization initiator; radical polymerization using azobisisonitrile having a hydroxy group and/or a functional group convertible into a hydroxy group or into a hydroxymethyl group as a polymerization initiator; by ionic polymerization in the presence of an alkyleneoxide, styreneoxide, epichlorohydrin or polyethyleneglycol; by ionic polymerization using an alkyleneoxide, epichlorohydrin or polyethyleneglycol as a polymerization terminator; or by ionic polymerization using an alkyllithium having a functional group convertible into a hydroxy group or into a hydroxymethyl group as a polymerization initiator.

A polymer made of an alkyne or a copolymer of an alkyne and another type of monomer is another preferred example of unsaturated polymer. An alkyne having a hydroxy group and/or a functional group convertible into a hydroxy group or into a hydroxymethyl group (iii) and/or another type of monomer, which is copolymerizable with an alkyne, having a hydroxy group and/or a functional group convertible into a hydroxy group or into a hydroxymethyl group (iv) may be used for all or a part of the raw materials of the unsaturated polymer.

One or more than two types of monomer may be used as the alkyne, and one or more than two types of monomer can be used as the monomer which is copolymerizable with an alkyne.

Suitable examples of alkynes include linear or cyclic alkynes such as acetylene, propyne, 1-butyne, 1-pentyne, 3-methyl-1-butyne, cyclopropylacetylene, 4-methyl-1-pentyne, 3,3-dimethyl-1-butyne, 2-butyne, 2-pentyne, 2-hexyne, 3-hexyne, 4-methyl-2-pentyne, 2-heptyne, cyclooctyne, phenylacetylene, diphenylacetylene, 1-phenyl-1-propyne, 1-phenyl-1-butyne and 1-phenyl-1-hexyne. The alkynes also include alkynes having a hydroxy group and/or a functional group convertible into a hydroxy group or into a hydroxymethyl group such as t-butoxyacetylene, acetoxyacetylene, 2-propyne-1-ol, 1-acetoxy-2-propyne, 1-tert-butoxy-2-propyne and 1-trimethylsiloxy-2-propyne.

Examples of other types of monomers, which are copolymerizable with an alkyne, include α-olefins such as ethylene, propylene, 1-butene, 2-butene, isobutene, 1-pentene, 2-pentene and 1-hexene; cycloolefins such as cyclohexene, cycloheptene and cyclooctene. The other types of monomers also include monomers having a hydroxy group and/or a functional group convertible into a hydroxy group or into a hydroxymethyl group such as substituted α-olefins of 3-butene-1-ol, 1,2-diacetoxy-3-butene or 1,2-di (methoxycarbonyloxy)-3-butene; substituted cycloolefins of 4-cyclooctene-1-ol, 1-acetoxy-4-cyclooctene, 3-cyclooctene-1-ol, 1-acetoxy-3-cyclooctene, 5-cyclooctene-1,2-diol, 1,2-diacetoxy-5-cyclooctene, 1,2-di (methoxycarbonyloxy)-5-cyclooctene, 4-cyclooctene-1,2-diol, 1,2-diacetoxy-4-cyclooctene or 1,2-di (methoxycarbonyloxy)-4-cyclooctene; vinyl esters of vinyl acetate, vinyl propionate or vinyl trifluoroacetate; vinyl ethers such as methyl vinyl ether, ethyl vinyl ether, propyl vinyl ether, butyl vinyl ether, tert-butyl vinyl ether and trimethylsilyl vinyl ether.

The unsaturated polymer may also be obtained by the polymerization of an alkyne or the copolymerization of an alkyne and another type of monomer using a chemical reagent having a hydroxy group and/or a functional group convertible into a hydroxy group or into a hydroxymethyl group as a polymerization initiator and/or a polymerization terminator. In such a case, a hydroxy group and/or a functional group convertible into a hydroxy group or into a hydroxymethyl group located at one end or both ends of the unsaturated polymer.

More specifically, the unsaturated polymer having an acetoxy group at one end of the polymer can be prepared by a metathesis polymerization using 1-acetoxy-3-butene as a polymerization terminator. Also, the unsaturated polymer having acetoxy groups at both ends of the polymer can be obtained by a metathesis polymerization using 1,6-diacetoxy-3-hexene as a polymerization terminator.

A polymer made of an allene derivative or a copolymer of an allene derivative and another type of monomer is also another preferred example of the unsaturated polymer. An allene derivative having a hydroxy group and/or a functional group convertible into a hydroxy group or into a hydroxymethyl group (v) and/or another type of monomer, which is copolymerizable with an allene derivative, having a hydroxy group and/or a functional group convertible into hydroxy group or into a hydroxymethyl group (vi) may be used for all or a part of the raw materials of the unsaturated polymer.

One or more than two types of monomer may be used as the allene derivative, and one or more than two type of monomers may be used as the monomer which is copolymerizable with an allene derivative.

Suitable examples of the allene derivatives include allenes such as allene; alkylallenes such as methylallene or ethylallene; phenylallene and cyanoallene. The allene derivatives also include allenes having a hydroxy group and/or a functional group convertible into a hydroxy group or into a hydroxymethyl group such as acetoxyallene, t-butoxyallene, trimethylsiloxyallene, hydroxymethylallene, acetoxymethylallene, t-butoxymethylallene and trimethylsiloxymethylallene; allene carboxylic esters such as methyl 2,3-butadienoate and ethyl 2,3-butadienoate.

Suitable examples of the another type of monomer, which is copolymerizable with an allene derivative, include conjugated ene-yne-compounds such as 3-methyl-3-butene-1-yne; linear conjugated dienes, which may have a substituent, such as 1,3-butadiene, isoprene, 1,3-pentadiene, 1,3-hexadiene, 1,3-heptadiene and chloroprene; cyclic conjugated dienes such as cyclopentadiene, 1,3-cyclohexadiene, 1,3-cycloheptadiene and 1,3-cyclooctadiene; isonitriles such as 1-pentylethylisonitrile. Other monomers also include substituted conjugated dienes having a hydroxy group and/or a functional group convertible into a hydroxy group or into a hydroxymethyl group such as 1-acetoxyl-1,3-butadiene, 1-tert-butoxy-1,3-butadiene, 1-methoxycarbonyloxy-1,3-butadiene, 1-trimethylsiloxy-1,3-butadiene, 2-acetoxyl-1,3-butadiene, 2-tert-butoxy-1,3-butadiene, 2-methoxycarbonyloxy-1,3-butadiene, 2-trimethylsiloxy-1,3-butadiene, 1-acetyloxyl-2-methyl-1,3-butadiene, 1-tert-butoxy-2-methyl-1,3-butadiene, 1-methoxycarbonyloxy-2-methyl-1,3-butadiene, 1-trimethylsiloxy-2-methyl-1,3-butadiene, 1-acetyloxyl-3-methyl-1,3-butadiene, 1-tert-butoxy-3-methyl-1,3-butadiene, 1-methoxycarbonyloxy-3-methyl-1,3-butadiene, 1-trimethylsiloxy-3-methyl-1,3-butadiene, 2-acetyloxyl-3-methyl-1,3-butadiene, 2-tert-butoxy-3-methyl-1,3-butadiene, 2-methoxycarbonyloxy-3-methyl-1,3-butadiene and 2-trimethylsiloxy-3-methyl-1,3-butadiene.

The unsaturated polymer may also be prepared by the polymerization of an allene derivative or by the copolymerization of an allene derivative and another type of monomer using a chemical reagent having a hydroxy group and/or a functional group convertible into hydroxy group or into a hydroxymethyl group as a polymerization initiator and/or a polymerization terminator. In such a case, a hydroxy group and/or a functional group convertible into a hydroxy group or into a hydroxymethyl group is located at one end or both ends of the unsaturated polymer.

More specifically, the unsaturated polymer having a hydroxy group or a functional group convertible into a hydroxy group or convertible into a hydroxymethyl group at one end of the polymer can be obtained by coordination polymerization under the presence of an equimolar amount, based on the polymerization catalyst, of an allene derivative having a hydroxy group and/or a functional group convertible into a hydroxy group or into a hydroxymethyl group at the start of the polymerization; or by polymerization using an allene derivative having a hydroxy group and/or a functional group convertible into a hydroxy group or convertible into a hydroxymethyl group as a polymerization terminator. The unsaturated polymer having a hydroxy group and/or a functional group convertible into a hydroxy group or convertible into a hydroxymethyl group at both ends of the polymer can be prepared by a polymerization method of the types discussed above.

Another preferred example of the unsaturated polymer is a polymer prepared by a ring-opening metathesis polymerization (ROMP) of a cyclic olefin. A cyclic olefin having a hydroxy group and/or a functional group convertible into a hydroxy group or convertible into a hydroxymethyl group (vii) may be used for all or a part of the raw materials of the unsaturated polymer.

One or more than two types of monomer may be used as the cyclic olefin, and one or more than two types of monomers may be used as the monomer which is copolymerizable with a cyclic olefin.

Suitable cyclic olefins include, for example, cyclobutene, cyclopentene, 3-methyl-1-cyclopentene, 4-methyl-1-cyclopentene, cyclopentadiene, cycloheptene, cyclooctene, 1,3-cyclooctadiene, 1,4-cyclooctadiene, 1,5-cyclooctadiene, 1,3,5-cyclooctatriene, 1,3,6-cycloctatriene, 1,3,5,7-cyclooctatetraene, 1-methyl-1,5-cyclooctadiene, 1,5-dimethyl-1,5-cyclooctadiene, 1,6-dimethyl-1,5-cyclooctadiene, norbornens which may have a substituent, norbornadienes which may have a substituent.

Suitable cyclic olefins also include those having a hydroxy group and/or a functional group convertible into a hydroxy group or convertible into a hydroxymethyl group such as 2-cyclopentene-1-ol, 3-cyclopentene-1-ol, 3-cyclopentene-1,2-diol, 1-acetoxy-2-cyclopentene, 1-acetoxy-3-cyclopentene, 1,2-diacetoxy-3-cyclopentene, 1-tert-butoxy-2-cyclopentene, 1-tert-butoxy-3-cyclopentene, 1,2-di-tert-butoxy-3-cyclopentene, 1-trimethylsiloxy-2-cyclopentene, 1-trimethylsiloxy-3-cyclopentene, 1,2-di(trimethylsiloxy)-3-cyclopentene, 4-cyclooctene-1-ol, 1-acetoxy-4-cyclooctene, 1-tert-butoxy-4-cyclooctene, 1-trimethylsiloxy-4-cyclooctene, 4-cyclooctene-1,2-diol, 1,2-diacetoxy-4-cyclooctene, 1,2-di-tert-butoxy-4-cyclooctene, 1,2-di(trimethylsiloxy)-4-cyclooctene, 1,2-di(methoxycarbonyloxy)-4-cyclooctene, 5-cyclooctene-1,2-diol, 1,2-diacetoxy-5-cyclooctene, 1,2-di-tert-butoxy-5-cyclooctene, 1,2-di(trimethylsiloxy)-5-cyclooctene, 1,2-di(methoxycarbonyloxy)-5-cyclooctene, 1,3,5,7-tetra(hydroxymethyl)-1,3,5,7-cyclooctatetraene, 1,3,5,7-tetra(acetoxymethyl)-1,3,5,7-cyclooctatetraene, 1,2,5,6-tetra(hydroxymethyl)-1,3,5,7-cyclooctatetraene and 1,2,5,6-tetra(acetoxymethyl)-1,3,5,7-cyclooctatetraene.

In addition, a cyclic ether can be copolymerized with the cyclic olefin. Examples of the cyclic ethers include tetrahydrofuran, 2-methyltetrahydrofuran and 1,4-dioxane.

The unsaturated polymer can also be obtained by the ring-opening metathesis polymerization of a cyclic olefin using a chemical reagent having a hydroxy group and/or a functional group convertible into a hydroxy group or into a hydroxymethyl group as a polymerization initiator and/or a polymerization terminator. In such a case, the hydroxy group and/or functional group convertible into a hydroxy group or into hydroxymethyl group is located at one end or both ends of the unsaturated polymer.

More specifically, the unsaturated polymer having a hydroxy group at one end of the polymer can be prepared by a ring-opening metathesis polymerization of a cyclic olefin using 3-butene-1-ol as a polymerization terminator. Also, the unsaturated polymer having hydroxy groups at both ends of the polymer can be prepared by a ring-opening metathesis polymerization of a cyclic olefin using 3-hexene-1,6-diol as a polymerization terminator. Similarly, the unsaturated polymer having an acetoxy group at one end of the polymer can be prepared by a ring-opening metathesis polymerization of a cyclic olefin using 1-acetoxy-3-butene as a polymerization terminator. In addition, the unsaturated polymer having acetoxy groups at both ends of the polymer can be prepared by a ring-opening metathesis polymerization of a cyclic olefin using 1,6-diacetoxy-3-hexene as a polymerization terminator.

A polymer prepared by the metathesis polymerization of an acyclic diene, which is so called ADMET (acyclic diene metathesis), is also a preferred example of the unsaturated polymer. An acyclic diene having a hydroxy group and/or a functional group convertible into hydroxy group or into a hydroxymethyl group (viii) may be used for all or a part of the raw materials of the unsaturated polymer.

One or more than two types of monomers can be used as the acyclic diene, and one or more than two types of monomer can be used as the monomer which is copolymerizable with an acyclic diene.

Suitable acyclic dienes include, for example, 1,5-hexadiene, 1,6-heptadiene and 1,7-octadiene. The acyclic dienes also which have a hydroxy group and/or a functional group convertible into a hydroxy group or into a hydroxymethyl group such as 1,6-heptadiene-4-ol, 4-acetoxy-1,6-heptadiene, 4-tert-butoxy-1,6-heptadiene, 4-trimethylsiloxy-1,6-heptadiene, 1,7-octadiene-4-ol, 4-acetoxy-1,7-octadiene, 4-tert-butoxy-1,7-octadiene and 4-trimethylsiloxy-1,7-octadiene.

The unsaturated polymer can also be prepared by the metathesis polymerization of an acyclic diene using a chemical reagent having a hydroxy group and/or a functional group convertible into hydroxy group or into a hydroxymethyl group as a polymerization initiator and/or a polymerization terminator. In such a case, the hydroxy group and/or the functional group convertible into a hydroxy group or into a hydroxymethyl group is located at one end or both ends of the unsaturated polymer.

More specifically, the unsaturated polymer having a hydroxy group at one end of the polymer can be prepared by the metathesis polymerization of an acyclic diene using 3-butene-1-ol as a polymerization terminator. Also, the unsaturated polymer having hydroxy groups at both ends of the polymer can be prepared by the metathesis polymerization of an acyclic diene using 3-hexene-1,6-diol as a polymerization terminator. Similarly, the unsaturated polymer having an acetoxy group at one end of the polymer can be prepared by the metathesis polymerization of an acyclic diene using 1-acetoxy-3-butene as a polymerization terminator. In addition, the unsaturated polymer having acetoxy groups at both ends of the polymer can be prepared by the metathesis polymerization of an acyclic diene using 1,6-diacetoxy-3-hexene as a polymerization terminator.

According to the present invention, the hydrogenation of the unsaturated polymer requires palladium on a base activated carbon or platinum on a base activated carbon.

When palladium or platinum is supported on an acid or a neutral activated carbon, the activities of the catalysts for the hydrogenation and the hydrogenolysis are both improved. The consequence of this improvement is that palladium or platinum on an acid or a neutral activated carbon tends to cause the elimination of the functional group of the unsaturated polymer, such as the hydroxy group and the functional group which is convertible into a hydroxy group or into a hydroxymethyl group, through the hydrogenation process. Commercially available palladium on carbon or platinum on carbon is a palladium catalyst or a platinum catalyst which is supported on an acid or a neutral activated carbon.

Base activated carbon can be prepared by a conventional method such as by (i) a process comprising immersing an activated carbon in an aqueous solution of a basic alkali metal compound such as sodium hydroxide, potassium hydroxide, sodium carbonate or potassium carbonate to neutralize the acidic functionalities present on the surface of the activated carbon and to deposit the alkali metal compound on the surface of the activated carbon or by (ii) chemical activation; e.g. an alkali activation [see pages 66–69 of "Activated Carbon—basis and application—(New Edition)" published on 1997 by KODANSHA Co., Ltd., edited by Y. Sanada, M. Suzuki and K. Fujimoto].

The BET surface area of the base activated carbon ranges preferably from 200 to 4000 $m^2/g$, more preferably from 400 to 3500 $m^2/g$.

The base activated carbon may be prepared from a material such as coconut shell, a synthetic resin, a petroleum pitch and/or a coal pitch. The base activated carbon can be in a form of a powder, a granule, a fiber or a molded article.

Deposition of palladium or platinum on a base activated carbon can be done by a conventional method [see, for example, pages 39–83 of "Shokubai-koza Vol. 5; Kougakuhen I; Syokubaisekkei" edited by Catalysis Society of Japan, published 1985]. More specifically, palladium on a base activated carbon can be prepared, for example, by the successive steps of immersing a base activated carbon, which may be treated with aqueous ammonia, into an aqueous palladium nitrate, removing excess palladium nitrate from the surface of the base activated carbon by washing with water, drying the basic activated carbon having palladium nitrate deposited on its surface, and converting the palladium nitrate deposited into palladium metal by hydrogenation. The amount of the palladium or the platinum deposited preferably ranges from 0.01 to 35 part by weight based on 100 part by weight of the base activated carbon. The amount is, from the viewpoint of the cost of production of the supported catalyst and the stability of the catalyst, more preferably from 0.1 to 15 part by weight, still more preferably from 0.2 to 10 part by weight, based on 100 part by weight of the base activated carbon.

The palladium on the base activated carbon or the platinum on the base activated carbon, which is the hydrogenation catalyst, is used in the reaction in an amount of preferably from 0.001 to 20 part by weight based on 100 part by weight of the unsaturated polymer. From the viewpoint of reaction rate and reaction efficiency, the palladium on a base activated carbon or the platinum on the base activated carbon is used in an amount of more preferably from 0.01 to 15 part by weight, still more preferably from 0.02 to 10 part by weight based on 100 part by weight of the unsaturated polymer.

The hydrogenation of the unsaturated polymer is conducted preferably in an appropriate solvent. Suitable examples of the solvent include aliphatic hydrocarbons such as pentane, hexane, octane, decane, cyclohexane, methylcyclohexane and cyclooctane; aromatic hydrocarbons such as benzene, toluene, xylene and mesitylene; alcohols such as methanol, ethanol, isopropanol, n-butanol, t-butanol and octanol; ethers such as diethyl ether, dipropyl ether, di(ethyleneglycol) dimethyl ether, tetrahydrofuran and dioxane. These solvents can be used singly or in combination.

There is no particular limitation on the amount of the solvent. However, from the viewpoint of processability, safety, efficiency and the cost of the hydrogenation process, the solvent is used in an amount preferably from 2 to 1000 times by weight, more preferably from 3 to 100 times by weight, based on the unsaturated polymer.

The hydrogenation of the unsaturated polymer can be conducted preferably in the presence of a base substance. Suitable base substance include, for example, salts of an organic acid such as sodium acetate, potassium acetate, calcium acetate, magnesium acetate, sodium propionate, potassium propionate, calcium propionate, magnesium propionate, sodium butanoate, potassium butanoate, calcium butanoate, magnesium butanoate, sodium adipate, potassium adipate, calcium adipate, magnesium adipate, sodium benzoate, potassium benzoate, calcium benzoate, magnesium benzoate, sodium phthalate, potassium phthalate, calcium phthalate and magnesium phthalate; organic bases such as triethylamine, tripropylamine, tributylamine, trioctylamine, triethanolamine, N-methylpyrrolidine, N-methylpiperidine, N,N-dimethylaniline and pyridine.

The amount of the base preferably ranges from 0.001 to 100 moles based on 1 gram atom of palladium or platinum. From the viewpoint of processability, reaction efficiency and the cost of the hydrogenation process, the base is used in an amount of more preferably from 0.01 to 80 moles, still more preferably from 0.1 to 20 moles, based on 1 gram atom of palladium or platinum.

The hydrogenation of the unsaturated polymer is conducted preferably at a hydrogen pressure of 0.1 to 5 MPa, more preferably at a hydrogen pressure of not more than 3 MPa. Also, the hydrogenation of the unsaturated polymer is conducted at a temperature of preferably 40 to 140° C., more preferably 60 to 120° C.

The hydrogenation ratio of the unsaturated polymer can be adjusted depending on the properties required for the hydrogenated polymer. In general, the hydrogenation ratio is set preferably from 90 to 100 mole %, more preferably from 95 to 100 mole %. The hydrogenation ratio is defined as the molar ratio of the carbon—carbon double bond which is hydrogenated based on the total moles of the carbon—carbon double bond of the starting unsaturated polymer. The hydrogenation ratio can be determined by a conventional method such as $^1$H-NMR analysis.

According to the present invention, the hydrogenation of the unsaturated polymer proceeds with substantially no elimination of the hydroxy group and/or the functional group which is convertible into a hydroxy group or into a hydroxymethyl group, even if the hydrogenation ratio is set as high as described above. Generally, 95% or more of the hydroxy group and/or the functional group which is convertible into hydroxy group or into a hydroxymethyl group of the starting unsaturated polymer is retained. In addition, 98% or more of such a functional group of the starting unsaturated polymer can be retained by the proper selection of the hydrogenation reaction conditions. The retention of the functional group can be detected by a conventional method such as $^1$H-NMR analysis.

The hydroxy group and/or the functional group which is convertible into a hydroxy group or into a hydroxymethyl group of the unsaturated polymer is generally retained as it is through the hydrogenation process. However, the hydroxy group and/or the functional group which is convertible into a hydroxy group or into a hydroxymethyl group of the unsaturated polymer may be converted, depending on the reaction conditions, into other functional groups through the hydrogenation process. For example, the epoxy group may be converted into a hydroxy group. An ester group may be converted into a hydroxymethyl group. An alkoxy group such as benzyloxy may be converted into a hydroxy group. In addition, the functional group which is convertible into a hydroxy group or into a hydroxymethyl group of the unsaturated polymer may be solvolyzed by the hydrogenation process. For example, an acyloxy group or a silyloxy group may be converted into a hydroxy group.

According to the present invention, the functional group thus converted is designated as a "retained" functional group.

The process of the present invention can be effected, for example, by the procedures comprising (a) charging an unsaturated polymer and a solvent into a pressure-proof reaction vessel, (b) dissolving the unsaturated polymer into the solvent, (c) adding a catalyst and, if required, a base to the prepared solution, (d) replacing the atmosphere of the reaction vessel with nitrogen and hydrogen, successively, and (e) keeping the reaction mixture at a given temperature under a given hydrogen pressure.

The hydrogenated polymer can be isolated from the reaction mixture by a conventional work-up procedure such as reprecipitation, removal of solvent by heat, removal of solvent under reduced pressure and removal of solvent with water, that is a so-called "steam stripping".

The hydrogenated polymer may be subjected to further modification, if required. The modification may involve the conversion of the hydroxy group and/or the functional group which is convertible into a hydroxy group or into a hydroxymethyl group of said hydrogenated polymer by a conventional method such as deprotection of a protective group from a protected hydroxy group, a protected carboxyl group or a protected aldehyde group.

Having generally described this invention, a further understanding can be obtained by reference to certain specific examples which are provided herein for purposes of illustration only and are not intended to be limiting unless otherwise specified.

REFERENCE EXAMPLE 1

Preparation of Palladium on a Base Activated Carbon

A 100 g amount of 5% aqueous potassium hydroxide was added to 100 g of coconut shell of a mean particle size of 3 mm, which had been carbonized at 500° C. under nitrogen. The prepared mixture was heated in an oil bath for 6 hours under nitrogen to remove water, and further heated at 200° C. for 3 hours under nitrogen to give 103 g of carbonized product onto which potassium hydroxide was deposited. The carbonized product obtained was activated, in an oven, by elevating its temperature from room temperature to 900° C. at a speed of 200° C. per 1 hour and by heating at 900° C. for 1 hour under a flow of combustion gas flowing at a rate of 100 ml per minute. After cooling to room temperature under nitrogen, the product was taken from the oven, washed with 10 L of water and dried at 200° C. for 8 hours to give 52 g of base activated carbon having basic surface and BET surface area of 600 m$^2$/g.

A 100 g amount of 5% aqueous ammonia was added to 50 g of the base activated carbon prepared above, and the prepared mixture was stirred at room temperature for 12 hours. The activated carbon was collected by filtration and washed with 2 liters of water. 100 ml of water and 5 g of palladium nitrate was added successively to the washed activated carbon. The resulting mixture was stirred at room temperature for 3 hours. The activated carbon was collected by filtration, washed with 3 liters of water and dried at 200° C. for 8 hours to give 55 g of base activated carbon onto the surface of which palladium nitrate was deposited. An autoclave having an inner volume of 1 liter was charged with 55 g of the base activated carbon prepared above, onto which palladium nitrate was deposited, and 500 ml of isopropanol. The atmosphere of the autoclave was replaced by hydrogen. The palladium nitrate deposited on the base activated carbon was converted into palladium metal by reduction at 140° C. for 8 hours under a flow of hydrogen at a rate of 100 ml per hour and at a pressure of 2 MPa. After cooling to room temperature, the atmosphere of the autoclave was replaced by nitrogen and 200 ml of water was added to the autoclave. The base activated carbon was collected by filtration and washed with 5 liters of water to give 94 g of palladium catalyst, the water content of which was 50% by weight. The prepared palladium catalyst was palladium on base activated carbon. The catalyst contained 4.8 weight % of palladium.

REFERENCE EXAMPLE 2

Preparation of Polybutadiene Having a Hydroxy Group at One Polymer End

An autoclave having an inner volume of 1 liter, equipped with a stirrer and a thermometer, was charged with 330 g cyclohexane. After the atmosphere of the autoclave was replaced with nitrogen, the autoclave was charged with 12 g of a solution of sec-buthyllithium in hexane at a concentration of 10.5% by weight. The temperature was raised to 50° C. and the autoclave was charged with 85.5 g of 1,3-butadiene over 1 hour to effect polymerization at 50° C. The reaction mixture obtained was agitated at 50° C. for 1 hour, and the polymerization was terminated by adding 1 g of ethylene oxide to the reaction mixture. After cooling to room temperature, 0.6 g of methanol, 0.3 g of acetic acid and 100 g of water were added successively to the resulting reaction mixture. After standing, the organic layer was collected and washed with water. Removal of solvent from the washed organic layer gave 82.2 g of polybutadiene having a number average molecular weight of 4,000 and having a hydroxy group at one polymer end.

EXAMPLE 1

An autoclave having an inner volume of 1 liter, equipped with a stirrer, a thermometer and a port for hydrogen, was charged with a solution of 20 g of polybutadiene having a hydroxy group at one polymer end, which was prepared in the Reference Example 2, in 220 g of toluene and 0.1 g of the palladium catalyst prepared in the Reference Example 1, successively, under nitrogen. After the atmosphere of the autoclave was replaced with hydrogen, the temperature of the mixture obtained was raised to 100° C. Hydrogenation of polybutadiene was conducted at 100° C. for 5 hours under a constant hydrogen pressure of 2 Mpa (gauge pressure), which was maintained by continuous supply of hydrogen. After cooling to room temperature, the atmosphere of the autoclave was replaced with nitrogen at atmospheric pressure and the palladium catalyst was removed by filtration. The filtrate was poured into 2 liters of methanol to precipitate 18.9 g of hydrogenated polybutadiene. Analysis of the product with 500 MHz $^1$H-NMR, measured in $CDCl_3$ at 30° C. showed that the conversion of carbon—carbon double bonds was not less than 99% and that 95 mole % of the hydroxy groups were retained.

COMPARATIVE EXAMPLE 1

The procedure of Example 1 was repeated except that 0.1 g of commercially available palladium on carbon [5% Pd E106NN/w; trade name, made by Degussa Japan co., Ltd.] was used instead of 0.1 g of the palladium catalyst prepared in the Reference Example 1. 18.4 g of hydrogenated polybutadiene was prepared from 20 g of polybutadiene having a hydroxy group at one polymer end and obtained as described in Reference Example 2. Analysis of the product by 500 MHz $^1$H-NMR showed that the conversion of carbon—carbon double bonds was 82% and that 81 mole % of the hydroxy group content was retained.

COMPARATIVE EXAMPLE 2

The procedure of Example 1 was repeated except that 0.1 g of commercially available Raney nickel [B111w; trade name, made by Degussa Japan Co.,Ltd.] was used instead of 0.1 g of the palladium catalyst obtained in Reference Example 1. 17.4 g of hydrogenated polybutadiene was obtained from 20 g of polybutadiene having a hydroxy group at one polymer end as prepared in Reference Example 2. Analysis of the product by 500 MHz $^1$HNMR showed that the conversion of carbon—carbon double bonds was 52% and that 84 mole % of the hydroxy groups were retained.

EXAMPLE 2

The procedure of Example 1 was repeated except that the pressure of hydrogenation was changed to 1.5 MPa. 18.4 g of hydrogenated polybutadiene was obtained from 20 g of polybutadiene having a hydroxy group at one polymer end and prepared in the above Reference Example 2. Analysis of the product by 500 MHz $^1$H-NMR showed that the conversion of carbon—carbon double bonds was not less than 99% and that not less than 97 mole % of the hydroxy groups were retained.

COMPARATIVE EXAMPLE 3

The procedure of Comparative Example 1 was repeated except that the pressure during hydrogenation was changed to 1.5 MPa. 18.3 g of hydrogenated polybutadiene was prepared from 20 g of polybutadiene having a hydroxy group at one polymer end as prepared in Reference Example 2. Analysis of the product by 500 MHz $^1$H-NMR showed that the conversion of the carbon—carbon double bonds was 78% and that 82 mole % of the hydroxy groups were retained.

EXAMPLE 3

The procedures of Example 1 were repeated except that 20 g of hydroxy terminated 1,2-polybutadiene having a number average molecular weight of 1,500 and having hydroxy groups at both polymer ends [NISSO-PB G-1000; trade name, made by Nippon Soda Co., Ltd.] was used instead of 20 g of polybutadiene having a hydroxy group at one polymer end. 18 g of hydrogenated 1,2-polybutadiene was obtained. Analysis of the product by 500 MHz $^1$H-NMR showed that the conversion of carbon—carbon double bonds was not less than 99% and that not less than 97 mole % of the hydroxy groups were retained.

COMPARATIVE EXAMPLE 4

The procedure of Example 3 was repeated except that 0.1 g of commercially available palladium on carbon [5%Pd E106NN/w; trade name, made by Degussa Japan Co., Ltd.] was used instead of 0.1 g of the palladium catalyst obtained as described in Reference Example 1. 17.8 g of hydrogenated 1,2-polybutadiene was obtained from 20 g of hydroxy terminated 1,2-polybutadiene [NISSO-PB G-1000]. Analysis of the product by 500 MHz $^1$H-NMR showed that the conversion of carbon—carbon double bonds was 67% and that 77 mole % of the hydroxy groups were retained.

EXAMPLE 4

An autoclave having an inner volume of 300 ml, equipped with a stirrer, a thermometer and a port for hydrogen, was charged with a solution of 4 g of poly(5-cyclooctene-1,2-diol) having a number average molecular weight (Mn) of 40,000 and a weight average molecular weight (Mw) of 120,000, which was prepared according to the method described in the "Example 1" of the U.S. Pat. No. 6,153,714, in the mixture of 70 g of tetrahydrofuran and 60 g of methanol, and 40 mg of the palladium catalyst obtained as described in Reference Example 1, successively, under nitrogen. After the atmosphere of the autoclave was replaced 3 times with hydrogen, the temperature of the mixture obtained was raised from room temperature to 100° C. gradually over 30 minutes, with stirring under a hydrogen pressure of 4 Mpa (gauge pressure). Hydrogenation of poly(5-cyclooctene-1,2-diol) was conducted at 100° C. for 4 hours under a constant hydrogen pressure of 4 Mpa (gauge pressure), which was maintained by continuous supply of hydrogen. After cooling to room temperature, the reaction mixture was removed from the autoclave. The reaction mixture was filtered to remove the palladium catalyst and poured into 300 ml of methanol to precipitate 3.9 g of hydrogenated polymer. Analysis of the product with 500 MHz $^1$H-NMR, measured in DMSO-d6 at 85° C. showed that the conversion of carbon—carbon double bonds was not less than 99% and that 95 mole % of the hydroxy groups were retained.

Having now fully described the invention, it will be apparent to one of the ordinary skill in the art that many changes and modifications can be made thereto without departing from the spirit or scope of the invention as set forth herein.

This application is based on Japanese Patent Application No. 2001-071530, filed on Mar. 14, 2001, the entire contents of which are hereby incorporated by reference.

What is claimed as new and is intended to be secured by letters patent is:

1. A method for producing a hydrogenated polymer, comprising:
   hydrogenating a polymer having carbon—carbon double bonds and hydroxy groups and/or functional groups which are convertible into hydroxy groups or into hydroxymethyl groups in the presence of a catalyst of palladium on a base activated carbon and/or platinum on a base activated carbon.

2. The method according to claim 1, wherein the functional group which is convertible into a hydroxy group or into a hydroxymethyl group is at least one moiety selected from the group consisting of the epoxy group, a protected hydroxy group, a protected carboxyl group and a protected aldehyde group.

3. The method according to claim 1, wherein the base activated carbon is prepared by treating an activated carbon with a base, depositing a palladium or platinum salt thereon and converting the metal compound to metal by hydrogenation.

4. The method according to claim 1, wherein the amount of catalyst ranges from 0.001 to 20 part by weight based on 100 parts by weight of unsaturated polymer.

5. The method according to claim 4, wherein the amount of catalyst ranges from 0.01 to 15 part by weight based on 100 parts by weight of unsaturated polymer.

6. The method according to claim 5, wherein the amount of catalyst ranges from 0.02 to 10 part by weight based on 100 parts by weight of unsaturated polymer.

7. The method according to claim 1, wherein the hydrogenation reaction is in a solvent medium of an aliphatic hydrocarbon, an aromatic hydrocarbon, an alcohol or an ether.

8. The method according to claim 1, wherein the hydrogenation reaction is conducted in the presence of a base in an amount of 0.001 to 100 moles per gram atom of Pd or Pt.

9. The method according to claim 1, wherein the hydrogenation reaction is conducted in the presence of a base in an amount of 0.01 to 80 moles per gram atom of Pd or Pt.

10. The method according to claim 1, wherein the hydrogenation of the unsaturated polymer is conducted under a hydrogen pressure of 0.1 to 5 Mpa at a temperature of 40 to 140° C.

11. The method according to claim 10, wherein the hydrogenation of the unsaturated polymer is conducted under a hydrogen pressure of not more than 3 Mpa at a temperature of 60 to 120° C.

12. The method according to claim 1, wherein the hydrogenation ratio ranges from 90 to 100 mole %.

13. The method according to claim 12, wherein the hydrogenation ratio ranges from 95 to 100 mole %.

14. The method according to claim 1, wherein 95% or more of the hydroxyl group content and/or the functional group which is convertible into a hydroxy group or into a hydroxymethyl group of the starting unsaturated polymer is retained.

15. The method according to claim 1, wherein the functional group convertible into a hydroxy group is an epoxy group; an acyloxy group, an alkoxy group, allyloxy, benzyloxy, alkoxycarbonyloxy, aryloxycarbonyloxy, alkoxyalkeneoxy or siloxy.

16. The method according to claim 15, wherein said acyloxy group is acetyloxy or benzoyloxy group, said alkoxy group is methoxy, ethoxy, propoxy or tert-butoxy, said alkoxycarbonyloxy group is methoxycarbonyloxy, ethoxycarbonyloxy or tert-butoxycarbonyloxy, said aryloxycarbonyloxy is phenyloxycarbonyloxy or benzyloxycarbonyloxy, said alkoxyalkeneoxy group is methoxymethyleneoxy, methoxyethyleneoxy or ethoxyethyleneoxy and said siloxy group is trimethylsiloxy or tert-butyldimethylsiloxy.

17. The method according to claim 1, wherein the functional group convertible into a into hydroxymethyl group is carboxymethyl, carboxyethyl or carboxybutyl.

18. The method according to claim 1, wherein the number average molecular weight of the unsaturated polymer ranges from 1,000 to 1,000,000.

19. The method according to claim 1, wherein the BET surface area of the base activated carbon support of the Pt and Pd metal catalysts ranges from 200 to 4000 m$^2$/g.

20. The method according to claim 1, wherein the amount of Pt or Pd metal deposited on the base activated carbon support ranges from 0.01 to 35 part by weight based on 100 parts by weight of the activated carbon.

* * * * *